United States Patent [19]

Stritzke et al.

[11] Patent Number: 4,626,382

[45] Date of Patent: Dec. 2, 1986

[54] METHOD OF PRODUCING A GLASS BLOCK CONTAINING RADIOACTIVE FISSION PRODUCTS AND APPARATUS THEREFOR

[75] Inventors: Detlef Stritzke, Mol; Eckhart Ewest, Balen; Wilfried Heimerl, Mol, all of Belgium

[73] Assignee: Deutsche Gesellschaft fur Wiederaufarbeitung von Kernbrennstoffen mbH, Hanover, Fed. Rep. of Germany

[21] Appl. No.: 627,474

[22] Filed: Jul. 3, 1984
(Under 37 CFR 1.47)

[30] Foreign Application Priority Data

Jul. 6, 1983 [DE] Fed. Rep. of Germany ....... 3324291

[51] Int. Cl.$^{4}$ ........................ C03B 25/04; C03B 40/02; G21F 9/30

[52] U.S. Cl. .................................... 252/629; 252/628; 252/633; 65/83; 65/84; 65/374.15; 250/506.1; 250/507.1; 220/412; 220/426; 220/457

[58] Field of Search ............................... 252/629, 633; 65/374.15, 83, 84; 250/507.1, 506.1; 220/412, 426, 457

[56] References Cited

U.S. PATENT DOCUMENTS

| | | | |
|---|---|---|---|
| 2,246,463 | 6/1941 | Garratt | 65/374.15 X |
| 3,301,650 | 1/1967 | Ward | 65/83 |
| 4,404,129 | 9/1983 | Penberthy et al. | 252/629 |
| 4,476,394 | 10/1984 | Müller et al. | 250/507.1 |

FOREIGN PATENT DOCUMENTS

| | | | |
|---|---|---|---|
| 0057430 | 11/1982 | European Pat. Off. | 252/633 |
| 1127591 | 9/1968 | United Kingdom | 65/374.15 |

*Primary Examiner*—Edward A. Miller
*Assistant Examiner*—Virginia B. Caress
*Attorney, Agent, or Firm*—Walter Ottesen

[57] ABSTRACT

The invention is directed to a method for making a glass block containing radioactive fission products in a metal vessel. The method includes the steps of placing the radioactive glass melt in the metal vessel and cooling the same therein. To minimize the formation of fissures in the glass block which is formed, the inner wall surfaces of the metal vessel are coated with a carbon material. The metal vessel is then placed in a thermally-insulating receptacle. The metal vessel is then filled with a radioactive glass melt emanating from a glass melting furnace and, after the filling step, is cooled slowly in the heat insulating receptacle. A container assembly for use in performing the method of the invention is also disclosed.

12 Claims, 2 Drawing Figures

METHOD OF PRODUCING A GLASS BLOCK CONTAINING RADIOACTIVE FISSION PRODUCTS AND APPARATUS THEREFOR

FIELD OF THE INVENTION

The invention relates to a method of producing a glass block containing radioactive fission products in a metal vessel wherein the radioactive glass melt is placed in the container and permitted to cool down therein.

BACKGROUND OF THE INVENTION

In the reprocessing of irradiated fuel elements, highly active waste is obtained in the form of highly active liquid concentrates of fission products. These liquid concentrates are solidified by appropriate vitrification processes. Through the addition of glass-forming materials, the radioactive substances are fused into glass in a glass melting furnace. The radioactive glass melt is dispensed from the furnace into so-called steel molds in the form of metal vessels made of high grade steel. After cooling and solidification of the glass block formed and possibly a fairly long period of surface storage, the glass-filled steel molds are then sent to the ultimate waste storage location.

Substantially three methods are known for filling the steel vessel from the glass melting furnace, namely: the bottom discharge system; the overflow system; and, the suction method.

The bottom discharge system basically includes an opening in the bottom of the furnace in which the glass can either be frozen up by cooling or else melted by heating. If the glass in the opening is melted, the glass melt running out fills a steel vessel standing below the furnace.

In the overflow system, the melt is preferably let out via a second chamber of the melting furnace, with a port in the side wall. The second chamber communicates with the main chamber at the bottom of the furnace. When a given filling level is exceeded, the glass runs out of the port in the side wall and through a horizontal overflow pipe into the steel mold.

In the suction method, a partial vacuum is established in the steel vessel and the vessel is sealed in a vacuum-tight manner. After a sealed suction tube mounted on the steel vessel dips into the glass melt from above and after the seal in the suction tube has been melted open, the partial vacuum in the steel vessel causes the glass melt to be drawn by suction into the closed storage vessel.

One difficulty in making the glass block in the steel mold lies in the tendency of the glass to develop fissures. Fissures form in the glass block during the cooling phase. Many different attempts have already been made to minimize this formation of fissures.

A method of minimizing the formation of fissures is disclosed in published German patent application DE-OS 28 46 845 wherein filling elements comprising metal structures are placed in the center of the steel vessel before the glass melt containing the fission products is poured therein. The filling elements may be in various forms and their function is to reduce substantially thermal tensions in the glass block during the cooling phase and to allow a large amount of heat to be conducted away to the wall of the steel vessel.

Results obtained with this method have not been satisfactory. Uncontrolled fissure formations were found to occur in the external part of the glass block.

SUMMARY OF THE INVENTION

It is an object of the invention to provide a method of filling a metal vessel with a radioactive glass melt wherein the formation of fissures in the glass block during cooling in the metal vessel is further reduced. It is a further object of the invention to provide an apparatus for carrying out the method of the invention.

The method of the invention is for producing a glass block containing radioactive fission products in a metal vessel disposed in a thermally-insulated receptacle. The method includes the steps of placing a layer of carbon material on the inner wall surfaces of the metal vessel; placing the metal vessel in the thermally-insulated receptacle; then filling the metal vessel with a melt of glass containing radioactive fission products emanating from a glass-melt furnace; and, slowly cooling the metal vessel filled with the glass melt while contained in the receptacle.

Glass blocks that are almost free of fissures have been obtained by the method of the invention. This substantial improvement is ascribed to the combined effect of the features according to the invention.

The improvement is due, firstly, to the coating of the metal vessel with carbon and, secondly, to the delayed cooling of the glass block in the insulating receptacle.

It is assumed that the carbon coating prevents the solidifying glass from adhering to the inner wall of the metal vessel. Movement is thereby maintained between the glass and the wall of the vessel. Shearing and tensile stresses in the glass block, which could occur as a result of interactions with the metal vessel, are thereby greatly reduced.

Arranging the metal vessel in a thermally insulating receptacle is a simple way of slowing down the cooling speed of the glass block. This delayed cooling prevents thermal-mechanical tensions from building up in the glass block and is explained by the fact that the glass is within the transformation temperature range where it is not yet solidified for a longer period of time.

Advantageous coatings for the inner wall surface of the metal vessel are graphite, graphite films and vitreous carbon. Graphite and vitreous carbon have very good heat conductance. The graphite separation layer can be sprayed onto the inner wall surface of the steel mold without any major technical problems.

Alternatively, the graphite separation layer can be defined by cladding the inner wall surface with a graphite foil.

The use of vitreous carbon affords the advantage that this material is extremely corrosion and erosion resistant. It cannot be wetted by ceramic melts and glasses. In addition, it has excellent resistance to changes of temperature.

If the mold is sprayed with a shielding gas during the filling process, burning of the graphite or carbon cladding will be prevented with certainty. The filling process can also be carried out without such a spraying of the metal vessel, since the $CO_2$ which forms during combustion would prevent any further burning of the carbon or graphite cladding because of the greater density of $CO_2$ as compared with air. Where the vessel is filled by the bottom discharge or overflow systems, the carbon or graphite coating must therefore merely be made thicker. The problem does not arise with the suction method, since no atmospheric oxygen is present and no combustion can therefore take place.

The invention also concerns an apparatus for carrying out the method of the invention. The apparatus of the invention is a container assembly which includes a metal vessel for accommodating the radioactive glass melt. A heat insulating receptacle has a cavity for holding the metal vessel therein. The container assembly further includes a carbon coating or cladding applied to the inner wall surface of the metal vessel.

The invention makes it possible to obtain glass blocks that are cast in metal vessels almost free of fissures. The solidification and cooling is caused by the heat liberated by the highly radioactive waste materials. The heating of the glass block after solidification and cooling can not cause any uncontrolled fissuring on the external surface of the glass block with the method and apparatus according to the invention because the coating of the inner wall surfaces of the metal vessel reduces friction and permits movement between the glass and the mold.

BRIEF DESCRIPTION OF THE DRAWING

The invention will now be described with reference to the drawing wherein.

DESCRIPTION OF THE PREFERRED EMBODIMENTS OF THE INVENTION

Figure 1:
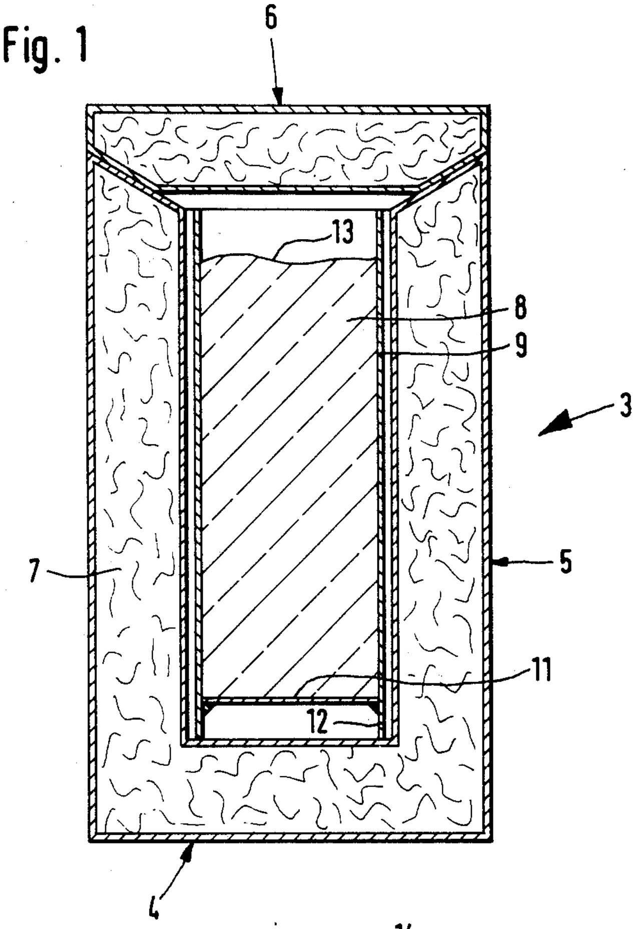
FIG. 1 is an elevation view, in section, showing a container assembly according to the invention for accommodating a radioactive glass melt and for delaying cooling of the melt; and, FIG. 2 is an exploded fragmentary view of the wall of the metal vessel of the container assembly of FIG. 1 with the separating layer of carbon applied to the inner wall surfaces thereof.

Referring to FIG. 1, the container assembly includes a thermally-insulating receptacle 3. The receptacle 3 has an insulating base 4 and has a cylindrical casing 5. An insulating sealing cover 6 covers the opening at the top of the receptacle 3. The sealing cover 6, cylindrical casing 5 and base 4 each have double walls conjointly defining a space therebetween filled with insulating material 7 such as aluminum oxide fibers, for example.

A steel vessel 9 receiving the glass melt 8 has a circular cross section having a diameter somewhat less than the inner diameter of the receptacle 3 in which the vessel 9 is arranged. The vessel 9 stands on the base 4 of the receptacle 3 and is provided with a raised base 11. The annular portion 12 extending downwardly beyond the raised base 11 defines a foot for the vessel 9. The steel vessel 9 is filled with a radioactive glass melt 8 and the filling level thereof is indicated by reference numeral 13.

Figure 2:
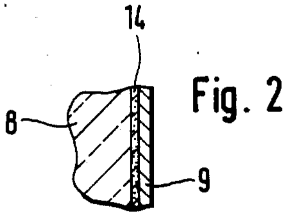

FIG. 2 is an exploded fragmentary view of the wall of the steel vessel 9. A graphite foil 14 is laid against the inner wall surface of the steel vessel 9. When the vessel 9 has been filled with a glass melt 8, the foil 14 is located between the glass melt 8 and the inner wall surface of the steel vessel. The inner wall surface of the vessel 9 and the melt 8 do not come into contact with one another.

An example of the method according to the invention will now be described.

A high-grade steel mold 9 made from the material according to DIN 1.4306 with a length of 1200 mm and a diameter of 298 mm is placed on the base of the heat-insulated receptacle 3. The inner surface of the steel mold 9 is clad with graphite paper 14 which is 0.5 mm thick. Graphite foils of this type are commercially available.

The apparatus is positioned under the melting furnace without its cover. The apparatus is raised in elevation to bring the steel mold up to the bottom outlet of the furnace. After the closure of the bottom outlet has melted, the steel mold is filled with approximately 145 kg of glass melt in about 90 minutes. After the bottom outlet has been frozen closed, the apparatus is lowered, the heat insulating cover is placed thereon and the apparatus driven to a storage location. The steel mold 9 is left in the heat-insulating receptacle 3 for three days. During this time the wall temperature of the mold 9 drops from approximately 850° C. to 80° C. In the meantime, the central temperature of the glass block drops from 1050° C. to 100° C.

The graphite cladding prevents any adhesion between metal and glass. The slow cooling of the steel mold in the heat-insulating receptacle prevents inadmissible thermal tensions from occurring. The glass block form shows only minimal fissuration.

It is understood that the foregoing description is that of the preferred embodiments of the invention and that various changes and modifications may be made thereto without departing from the spirit and scope of the invention as defined in the appended claims.

What is claimed is:

1. Method of producing a glass block containing radioactive fission products in a metal vessel, the method comprising the steps of:

applying a layer of carbon material on substantially the entire inner wall surfaces of said metal vessel to facilitate movement between said vessel and the glass block to be formed therein;

placing said metal vessel in a thermally-insulated receptacle having a thermally-insulated cover;

then filling said metal vessel with a melt of glass containing radioactive fission products emanating from a glass-melt furnace;

covering said receptacle with said cover thereby closing off the melt of glass with respect to the ambient; and, allowing said metal vessel filled with the glass melt to cool in said receptacle for a predetermined period of time during which said movement occurs thereby inhibiting the formation of fissures in said block.

2. The method of claim 1, wherein the step of placing said layer of carbon material on the inner wall surfaces of said metal vessel includes cladding said inner wall surfaces with graphite.

3. The method of claim 1, wherein the step of placing said layer of carbon material on the inner wall surfaces of said metal vessel includes cladding said inner wall surfaces with graphite foil.

4. The method of claim 1, wherein the step of placing said layer of carbon material on the inner wall surfaces of said metal vessel includes coating said inner wall surfaces with vitreous carbon.

5. The method of claim 1, comprising the further step of spraying said metal vessel with shielding gas while performing said step of filling said metal vessel with the glass melt thereby preventing said layer of carbon material from burning.

6. A container assembly for cooling down a glass melt containing radioactive fission products into a glass block, the container assembly comprising:

a thermally-insulating receptacle having a cavity defining a cavity wall surface;

a thermally-insulated cover for covering said receptacle and closing off said cavity with respect to the ambient;

a metal vessel for receiving the glass melt therein and having an outer peripheral side wall surface, said metal vessel being disposed in said cavity so as to cause said outer peripheral side wall surface and said cavity wall surface to conjointly define an air gap about the entire outer peripheral side wall surface of said vessel thereby slowing the transfer of heat from said vessel to said receptacle when said vessel is charged with the glass melt; and, a layer of carbon material on the inner wall surfaces of said vessel for facilitating movement between a solidifying glass melt and said inner wall surface of said vessel.

7. The container assembly of claim 6, wherein said layer of carbon is a coating of carbon material applied to said inner wall surfaces of said vessel.

8. The container assembly of claim 6, wherein said layer of carbon is a cladding of carbon material applied to said inner wall surfaces of said vessel.

9. The container assembly of claim 6, comprising a thermally-insulating sealing cover for closing said cavity of said receptacle.

10. The container assembly of claim 6, comprising spacer means disposed between the base of said vessel and the base of said receptacle for defining a space therebetween thereby further slowing the transfer of heat from said vessel to said receptacle.

11. Method of producing a glass block containing radioactive fission products in a metal vessel, the method comprising the steps of:

applying a layer of carbon material on the inner wall surfaces of said metal vessel;

seating said metal vessel in a thermally-insulated receptacle having a thermally-insulated cover so as to cause said vessel and said receptacle to conjointly define an air gap about substantially the entire outer peripheral wall surface of said metal vessel;

then filling said metal vessel with a melt of glass containing radioactive fission products emanating from a glass-melt furnace;

covering said receptacle with said cover thereby closing off the melt of glass with respect to the ambient; and, allowing said metal vessel filled with the glass melt to cool in said receptacle.

12. The method of claim 1, wherein said glass melt is allowed to cool from approximately 1050° C. to approximately 100° C. in approximately three days.

* * * * *

UNITED STATES PATENT AND TRADEMARK OFFICE
CERTIFICATE OF CORRECTION

PATENT NO. : 4,626,382

DATED : December 2, 1986

INVENTOR(S) : Detlef Stritzke, Eckhart Ewest and Wilfried Heimerl

It is certified that error appears in the above-identified patent and that said Letters Patent is hereby corrected as shown below:

On the front page, please delete "(Under 37 CFR 1.47)" under the filing date.

Signed and Sealed this

Tenth Day of March, 1987

*Attest:*

DONALD J. QUIGG

*Attesting Officer* *Commissioner of Patents and Trademarks*